(12) United States Patent
Kaita et al.

(10) Patent No.: US 6,683,140 B2
(45) Date of Patent: Jan. 27, 2004

(54) CATALYST FOR POLYMERIZATION

(75) Inventors: Shojiro Kaita, Saitama (JP); Zhaomin Hou, Tokyo (JP); Yasuo Wakatsuki, Saitama (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 09/945,666

(22) Filed: Sep. 5, 2001

(65) Prior Publication Data

US 2002/0119889 A1 Aug. 29, 2002

(30) Foreign Application Priority Data

Feb. 28, 2001 (JP) ........................................ 2001/053550

(51) Int. Cl.⁷ .......................... C08F 4/52; C08F 236/10; C07F 5/00
(52) U.S. Cl. ..................... 526/160; 526/134; 526/164; 526/170; 526/340.4; 526/943; 502/152; 502/154; 534/15
(58) Field of Search ................................. 526/160, 164, 526/170, 943, 134, 340.4; 502/152, 154; 534/15

(56) References Cited

U.S. PATENT DOCUMENTS

| | | | | |
|---|---|---|---|---|
| 4,716,257 A | * | 12/1987 | Marks et al. ................. 585/275 |
| 5,109,085 A | * | 4/1992 | Pettijohn et al. ............ 526/160 |
| 5,744,415 A | * | 4/1998 | Wenzel ........................ 502/121 |
| 5,977,270 A | * | 11/1999 | Wenzel ........................ 526/160 |
| 6,284,697 B1 | * | 9/2001 | Windisch et al. ....... 526/164 X |
| 6,433,203 B1 | * | 8/2002 | Dall'occo et al. ............. 556/11 |

\* cited by examiner

*Primary Examiner*—Fred Teskin
(74) *Attorney, Agent, or Firm*—Millen, White, Zelano & Branigan, P.C.

(57) ABSTRACT

A catalyst in a solid state for polymerization of a conjugated diene or copolymerization of a conjugated diene and an aromatic vinyl compound, which comprises a metallocene-type cation complex of a rare earth metal compound. The catalyst typically is a trivalent rare earth metal compound represented by the general formula (I): $R_aMX_b$, wherein M represents a rare earth metal; R represents cyclopentadienyl group, a substituted cyclopentadienyl group, indenyl group, a substituted indenyl group, fluorenyl group, or a substituted fluorenyl group; X represents an anion; symbol "a" represents an integer of 1 or 2; and symbol "b" represents an integer of 1 or 2.

14 Claims, No Drawings

CATALYST FOR POLYMERIZATION

TECHNICAL FIELD

The present invention relates to a catalyst for polymerization which is used for polymerization of a conjugated diene, copolymerization of a conjugated diene and an aromatic vinyl compound and the like.

BACKGROUND ART

Various proposals have been made so far as to polymerization catalysts for conjugated dienes, and they play a highly important role in industrial fields. In particular, various polymerization catalysts which give a high 1,4-cis-linkage content have been studied and developed to obtain conjugated diene polymers with enhanced performance in thermal and mechanical properties. For example, complex catalyst systems containing a compound of a transition metal such as nickel, cobalt and titanium as a main component are known, and some of them have already been widely used for industrial applications as polymerization catalysts for butadiene, isoprene and the like (see, End. Ing. Chem., 48, 784, 1956; Japanese Patent Publication No. 37-8198).

In order to attain a higher 1,4-cis-linkage content and superior polymerization activity, complex catalyst systems which consist of a rare earth metal compound and an organometallic compound belonging to Group I to Group III have been studied and developed, and highly stereospecific polymerization has come to be actively studied (Makromol. Chem. Suppl, 4, 61, 1981; J. Polym. Sci., Polym. Chem. Ed., 18, 3345, 1980; German Patent Application No. 2,848,964; Sci. Sinica., 2/3, 734, 1980; Rubber Chem. Technol., 58, 117, 1985 and the like.). Among these catalyst systems, complex catalysts containing a neodymium compound and an organoaluminum compound as main components were revealed to give a high 1,4-cis-linkage content and have superior polymerization activity. The catalysts have already been used industrially as polymerization catalysts for butadiene and the like (see, Macromolecules, 15, 230, 1982; Makromol. Chem., 94, 119, 1981).

With recent progress of industrial technologies, requirements for polymeric materials from a commercial viewpoint have become increasingly higher levels, and development of polymeric materials which have still higher thermal properties (thermal stability and the like) and mechanical properties (tensile modulus, bending modulus and the like) has been strongly desired. As one of promising means for achieving the object, there have been attempted to produce a polymer of a high 1,4-cis-configuration content in microstructure and a narrow molecular weight distribution by using a catalyst having a high polymerization activity for conjugated dienes.

For example, it is known that, when a samarocene complex is used as a polymerization catalyst of 1,3-butadiene and MMAO or $AlR_3/[Ph_3C][B(C_6F_5)_4]$ is used in combination with the catalyst as a promoter, a polybutadiene, which is highly regulated in 1,4-cis-configuration and has a narrow molecular weight distribution, is obtained in high yields (Kaita, S., et al., Macromolecules, 32, 9078, 1999). Moreover, it has been revealed that the polymerization livingly progresses in systems using $(C_5Me_5)_2Sm[\mu\text{-Me}]$ $AlMe(\mu\text{-Me})]_2Sm(C_5Me_5)_2/Al(i\text{-Bu})_3/[Ph_3C][B(C_6F_5)_4]$ as a catalyst, and the molecular weight of the produced polymer has become controllable (Kaita, S., et al., Polym. Prepr. Jpn., 49, 211, 2000). In addition, the compositions disclosed in the specification of PCT/JP00/1188 are known as catalyst compositions for polymerization.

DISCLOSURE OF THE INVENTION

An object of the present invention is to provide a catalyst by which the polymerization of a conjugated diene or the copolymerization of a conjugated diene and an aromatic vinyl compound can be efficiently and inexpensively performed. In particular, the object of the present invention is to provide a catalyst for polymerization which is used to efficiently and inexpensively produce polymers with a high 1,4-cis-configuration content in microstructure and a narrow molecular weight distribution.

The inventors of the present invention conducted various studies to achieve the foregoing objects. As a result, they found that a polymer can be produced in a highly efficient and inexpensive manner by performing polymerization of a conjugated diene or copolymerization of a conjugated diene and an aromatic vinyl compound using a metallocene-type cation complex of a rare earth metal compound as a catalyst in the presence of an organoaluminum compound. In addition, they found that a polymer with an extremely high 1.4-cis-configuration content in microstructure and a narrow molecular weight distribution can be efficiently and inexpensively produced by using the aforementioned catalyst. The present invention was achieved on the basis of these findings.

The present invention thus provides a catalyst for polymerization of a conjugated diene or copolymerization of a conjugated diene and an aromatic vinyl compound, which comprises a metallocene-type cation complex of a rare earth metal compound. This catalyst is characterized in that the polymerization of a conjugated diene or the copolymerization of a conjugated diene and an aromatic vinyl compound can be efficiently preformed by using the catalyst in the presence of an organoaluminum compound. The catalyst is preferably provided in a solid state and added, from the outside of a reaction system into the reaction system, as a solid state or as a state of a solution obtained by dissolving the complex in a solid state as a catalyst for the polymerization of a conjugated diene or the copolymerization of a conjugated diene and an aromatic vinyl compound.

From another aspect of the present invention, there is provided a method for polymerization of a conjugated diene or copolymerization of a conjugated diene and an aromatic vinyl compound, wherein the polymerization is performed by using a metallocene-type cation complex of a rare earth metal compound in the presence of an organoaluminum compound. According to a preferred embodiment, the aforementioned metallocene-type cation complex is added as a solid state to the reaction system or added as a solution obtained by dissolving the complex in a solid state to the reaction system. From further aspect of the present invention, there is provided a use of a metallocene-type cation complex as a solid state for polymerization of a conjugated diene or copolymerization of a conjugated diene and an aromatic vinyl compound.

By using the catalyst of the present invention, a polymer can be efficiently and inexpensively obtained which has an extremely high content of 1,4-cis-configuration in the microstructure and a narrow molecular weight distribution.

BEST MODE FOR CARRYING OUT THE INVENTION

Examples of the metallocene type complex of a rare earth metal compound include trivalent rare earth metal compounds represented by the general formula (I): $R_aMX_b$ wherein M represents a rare earth metal; R represents cyclopentadienyl group, a substituted cyclopentadienyl group, indenyl group, a substituted indenyl group, fluorenyl group, or a substituted fluorenyl group; X represents an anion; symbol "a" represents an integer of 1 or 2; and symbol "b" represents an integer of 1 or 2.

In the aforementioned general formula (I), an element selected from those of atomic numbers 57 to 71 in the periodic table can be used as the rare earth metal represented by M. Specific examples of the rare earth metal include lanthanium, cerium, praseodymium, neodymium, promethium, samarium, europium, gadolinium, terbium, dysprosium, holmium, erbium, thulium, ytterbium and lutetium. Among them, samarium is preferred. When the symbol "a" is 2, two of "R" may be the same or different. Similarly, when the symbol "b" is 2, two of "X" may be the same or different.

The types, numbers, and substituting positions of one or more substituents of the substituted cyclopentadienyl group, substituted indenyl group, and substituted fluorenyl group are not particularly limited. Examples of the substituent include, for example, methyl group, ethyl group, n-propyl group, isopropyl group, n-butyl group, isobutyl group, sec-butyl group, tert-butyl group, hexyl group, phenyl group and benzyl group, as well as hydrocarbonic groups containing a silicon atom such as trimethylsilyl group. R may be bound to a part of X by means of a bridging group such as dimethylsilyl group, dimethylmethylene group, methylphenylmethylene group, diphenylmethylene group, ethylene group, and substituted ethylene group, and two of R may be bound to each other by means of a bridging group such as dimethylsilyl group, dimethylmethylene group, methylphenylmethylene group, diphenylmethylene group, ethylene group, and substituted ethylene group.

Specific examples of the substituted cyclopentadienyl group include, for example, methylcyclopentadienyl group, benzylcyclopentadienyl group, vinylcyclopentadienyl group, 2-methoxyethylcyclopentadienyl group, trimethylsilylcyclopentadienyl group, tert-butylcyclopentadienyl group, ethylcyclopentadienyl group, phenylcyclopentadienyl group, 1,2-dimethylcyclopentadienyl group, 1,3-dimethylcyclopentadienyl group, 1,3-di(tert-butyl) cyclopentadienyl group, 1,2,3-trimethylcyclopentadienyl group, 1,2,3,4-tetramethylcyclopentadienyl group, pentamethylcyclopentadienyl group, 1-ethyl-2,3,4,5-tetramethylcyclopentadienyl group, 1-benzyl-2,3,4,5-tetramethylcyclopentadienyl group, 1-phenyl-2,3,4,5-tetramethylcyclopentadienyl group, 1-trimethylsilyl-2,3,4,5-tetramethylcyclopentadienyl group, 1-trifluoromethyl-2,3,4,5-tetramethylcyclopentadienyl group and the like. Specific examples of the substituted indenyl group include, for example, 1,2,3-trimethylindenyl group, heptamethylindenyl group, 1,2,4,5,6,7-hexamethylindenyl group and the like. Pentamethylcyclopentadienyl group is preferred as R.

Examples of the anion represented by X include, for example, tetra(phenyl)borate, tetrakis(monofluorophenyl) borate, tetrakis(difluorophenyl)borate, tetrakis (trifluorophenyl)borate, tetrakis(trifluorophenyl)borate, tetrakis(pentafluorophenyl)borate, tetrakis (tetrafluoromethylphenyl)borate, tetra(tolyl)borate, tetra (xylyl)borate, (triphenyl, pentafluorophenyl)borate, [tris (pentafluorophenyl), phenyl]borate, tridecahydride-7,8-dicarbaundecaborate and the like.

Specific examples of the metallocene-type cation complex of a rare earth metal compound represented by the formula (I) include, for example, bispentamethylcyclopentadienylsamarium tetrakis(pentafluorophenyl)borate, bispentamethylcyclopentadienylcerium tetrakis (pentafluorophenyl)borate, bispentamethylcyclopentadienylpraseodymium tetrakis(pentafluorophenyl)borate, bispentamethylcyclopentadienylneodymium tetrakis (pentafluorophenyl)borate, bispentamethylcyclopentadienylgadolinium tetrakis(pentafluorophenyl)borate and the like.

The metallocene-type cation complex represented by the aforementioned formula (I) can be prepared, for example, by reacting an ionic compound and a divalent or trivalent rare earth metal compound represented by the general formula (II): $R_aMX_bQX_b$, wherein M represents a rare earth metal, preferably those exemplified above, and most preferably samarium; X represents hydrogen atom, a halogen atom, an alkoxide group, a thiolate group, an amido group, or a hydrocarbon group having 1 to 20 carbon atoms; Q represents an element belonging to Group III in the periodic table; symbol "a" represents an integer of 1, 2 or 3; and symbol "b" represents an integer of 0, 1 or 2.

The reaction may be carried out by dissolving the rare earth metal compound represented by the general formula (II) and the ionic compound in an inert solvent to allow reaction to each other at a temperature of 0° C. to an elevated temperature, preferably at room temperature, for 10 minutes to a few hours, preferably about 1 hour. The complex of the general formula (I) without an element represented by Q is obtained in a high yield by reacting the rare earth metal compound represented by the general formula (II) with two equivalents of the ionic compound. A typical example of the reaction is shown below:

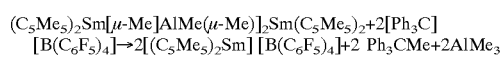

The aforementioned reaction can be carried out under an atmosphere of an inert gas such as nitrogen and argon in an inert solvent. The type of the inert solvent is not particularly limited, and there can be used, for example, a solvent including saturated aliphatic hydrocarbons such as butane, pentane, hexane and heptane; saturated cycloaliphatic hydrocarbons such as cyclopentane and cyclohexane; monoolefins such as 1-butene and 2-butene; aromatic hydrocarbons such as benzene and toluene; halogenated hydrocarbons such as methylene chloride, chloroform, carbon tetrachloride, trichloroethylene, perchloroethylene, 1,2-dichloroethane, chlorobenzene, bromobenzene and chlorotoluene and the like. Among them, toluene is preferred. Two or more solvents may be used in combination. The resulting complex of the general formula (I) can be taken out of the reaction system as a solid by applying a common separation operation. In general, the complex having a practically sufficient purity can be obtained by evaporating a reaction solvent, washing the desired product obtained as a residue with an inert solvent, and drying the product under reduced pressure.

In the aforementioned general formula (II), the alkoxide group represented by X may be any of aliphatic alkoxy groups such as methoxy group, ethoxy group, propoxy group, n-butoxy group, isobutoxy group, sec-butoxy group and tert-butoxy group, and aryl oxide groups such as phenoxy group, 2,6-di-tert-butylphenoxy group, 2,6-diisopropylphenoxy group, 2,6-dineopentylphenoxy group, 2-tert-butyl-6-isopropylphenoxy group, 2-tert-butyl-6-neopentylphenoxy group and 2-isopropyl-6-neopentylphenoxy group. A preferred example includes 2,6-di-tert-butylphenoxy group.

The thiolate group represented by X may be any of aliphatic thiolate groups such as thiomethoxy group, thioethoxy group, thiopropoxy group, thio-n-butoxy group, thioisobutoxy group, thio-sec-butoxy group and thio-tert-butoxy group, and aryl thiolate groups such as thiophenoxy group, 2,6-di-tert-butylthiophenoxy group, 2,6-diisopropylthiophenoxy group, 2,6-dineopentylthiophenoxy group, 2-tert-butyl-6-isopropylthiophenoxy group, 2-tert-butyl-6-thioneopentylphenoxy group, 2-isopropyl-6-thioneopentylphenoxy group and 2,4,6-triisopropylthiophenoxy group. A preferred example includes 2,4,6-triisopropylthiophenoxy group.

The amido group may be any of aliphatic amido groups such as dimethylamido group, diethylamido group and diisopropylamido group, and arylamido groups such as phenylamido group, 2,6-di-tert-butylphenylamido group, 2,6-diisopropylphenylamido group, 2,6-dineopentylphenylamido group, 2-tert-butyl-6-isopropylphenylamido group, 2-tert-butyl-6-neopentylphenylamido group, 2-isopropyl-6-neopentylphenylamido group and 2,4,6-tert-butylphenylamido group. A preferred example includes 2,4,6-tert-butylphenylamido group.

The halogen atom represented by X may be any of fluorine atom, chlorine atom, bromine atom, and iodine atom. Chlorine atom and iodine atom are preferred. Specific examples of the hydrocarbon group having 1 to 20 of carbon atoms include, for example, linear or branched aliphatic hydrocarbon groups such as methyl group, ethyl group, n-propyl group, isopropyl group, n-butyl group, isobutyl group, sec-butyl group, tert-butyl group, neopentyl group, hexyl group and octyl group, aromatic hydrocarbon groups such as phenyl group, tolyl group and naphthyl group, and aralkyl groups such as benzyl group, as well as hydrocarbonic groups containing a silicon atom such as trimethylsilylmethyl group and bistrimethylsilylmethyl group. Among them, methyl group, ethyl group, isobutyl group, trimethylsilylmethyl group and the like are preferred. As X, hydrogen atom, a halogen atom, or a hydrocarbon group having 1 to 20 carbon atoms is preferred.

Q represents an element belonging to Group III in the periodic table. Specific examples of such element include boron, aluminum, gallium and the like. Aluminum is preferred. Specific examples of the metallocene-type complex of a rare earth metal compound represented by the formula (II) include, for example, dimethylaluminum($\mu$-dimethyl)bis(pentamethylcyclopentadienyl) samarium and the like.

As the ionic compound, any one may be used so long as the ionic compound is composed of a non-coordinate anion and a cation and can react with the rare earth metal compound represented by the aforementioned formula (II) to generate the complex of the aforementioned formula (I). Examples of the non-coordinate anion include, for example, tetra(phenyl)borate, tetrakis(monofluorophenyl)borate, tetrakis(difluorophenyl)borate, tetrakis(trifluorophenyl)borate, tetrakis(trifluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate, tridecahydride-7,8-dicarbaundecaborate and the like.

Examples of the cation include, for example, carbonium cations, oxonium cations, ammonium cations, phosphonium cations, cycloheptatrienyl cations, ferrocenium cations that contain a transition metal and the like. Specific examples of the carbonium cations include trisubstituted carbonium cations such as triphenylcarbonium cation and trisubstituted phenylcarbonium cations. Specific examples of the trisubstituted phenylcarbonium cations include tri(methylphenyl)carbonium cation, tri(dimethylphenyl)carbonium cation and the like. Specific examples of the ammonium cations include trialkylammonium cations such as trimethylammonium cation, triethylammonium cation, tripropylammonium cation, tributylammonium cation and tri(n-butyl)ammonium cation, N,N-dialkylanilinium cations such as N,N-diethylanilinium cation and N,N-2,4,6-pentamethylanilinium cation, dialkylammonium cations such as di(isopropyl)ammonium cation and dicyclohexylammonium cation and the like. Specific examples of the phosphonium cations include triarylphosphonium cations such as triphenylphosphonium cation, tri(methylphenyl)phosphonium cation and tri(dimethylphenyl)phosphonium cation.

As the ionic compounds, a combination of components each arbitrarily selected from the non-coordinate anion or the cation may preferably be used. Preferred examples of the ionic compound are, for example, triphenylcarbonium tetrakis(pentafluorophenyl)borate, triphenylcarbonium tetrakis(tetrafluorophenyl)borate, N,N-dimethylanilinium tetrakis(pentafluorophenyl)borate, 1,1'-dimethylferrocenium tetrakis(pentafluorophenyl)borate and the like. The ionic compounds may be used alone, or two or more of them may be used in combination. As a Lewis acid that can react with a transition metal compound to generate a cationic transition metal compound, $B(C_6F_5)_3$, $Al(C_6F_5)_3$ and the like may be used, and these acids may be used in combination with the aforementioned ionic compounds.

The catalyst of the present invention can be used for the polymerization of a conjugated diene or the copolymerization of a conjugated diene and an aromatic vinyl compound in the presence of an organoaluminum compound. Examples of the organoaluminum compound include, for example, trialkylaluminum such as trimethylaluminum, triethylaluminum and triisobutylaluminum, mixtures thereof and the like, and trimethylaluminum is most preferred. A mixture of trimethylaluminum and tributylaluminium may be used. The amount of the organoaluminum compound used is not particularly limited, and for example, two or more equivalents of the organoaluminum compound to the complex represented by the formula (I) may be used, more preferably about two equivalents.

The type of the conjugated diene compound as a monomer that can be polymerized by the polymerization method of present invention is not particularly limited. Examples of the monomer include, for example, 1,3-butadiene, isoprene, 1,3-pentadiene, 2-ethyl-1,3-butadiene, 2,3-dimethylbutadiene, 2-methylpentadiene, 4-methylpentadiene, 2,4-hexadiene or the like. Among them, 1,3-butadiene is preferred. These monomer components may be used alone, or two or more of them may be used in combination. The type of the aromatic vinyl compound monomer that can be copolymerized by the polymerization method of present invention is not particularly limited, and for example, styrene, p-methylstyrene, m-methylstyrene, p-tert-butylstyrene, α-methylstyrene, chloromethylstyrene, p-tert-butoxystyrene, dimethylaminomethylstyrene, dimethylaminoethylstyrene, vinyltoluene or the like may be used. Among them, styrene is preferred. These monomer components may be used alone, or two or more of them may be used in combination.

The polymerization method of the present invention may be performed either in the presence or absence of a solvent. Where a solvent is used, the kind of the solvent is not particularly limited so long as the solvent is substantially inactive in the polymerization reaction and has sufficient solubility for the monomer and the catalyst composition. Examples of the solvent include, for example, saturated aliphatic hydrocarbons such as butane, pentane, hexane and heptane; saturated cycloaliphatic hydrocarbons such as cyclopentane and cyclohexane; monoolefins such as 1-butene and 2-butene; aromatic hydrocarbons such as benzene and toluene; halogenated hydrocarbons such as methylene chloride, chloroform, carbon tetrachloride, trichloroethylene, perchloroethylene, 1,2-dichloroethane, chlorobenzene, bromobenzene and chlorotoluene. Among them, toluene is preferred. Two or more solvents may be used in combination.

Polymerization temperature in the polymerization method of the present invention may be, for example, in the range of from −100° C. to 100° C., preferably in the range of from −50° C. to 80° C. Polymerization time may be, for example, about 1 minute to 12 hours, preferably about 5 minutes to 5 hours. However, these reaction conditions may be suitably selected depending on the type of monomers and the type of the catalyst, and they are not limited to the ranges exemplified above. After the polymerization reaction reaches to a given polymerization degree, the reaction may be stopped by adding a known polymerization terminator to the polymerization system, and then a produced polymer may be separated from the reaction system in a conventional manner.

The polymerization method of the present invention is usually performed by adding the catalyst of the general formula (I) in a solid state to the reaction system, further adding the organoaluminum compound, and then introducing a monomer into the reaction system. However, the order of adding the aforementioned catalyst, organoaluminum compound and reactant monomer may be appropriately changed. The polymerization method of the present invention is characterized in that the polymerization is performed by introducing the catalyst of the general formula (I) in a solid state into the reaction system, and thereby the reaction cost is reduced and efficient polymerization can be achieved. For example, the catalyst of the general formula (I) of the present invention, which is obtained by reacting the rare earth metal compound represented by the aforementioned general formula (II): $R_aMX_bQX_b$ with the aforementioned ionic compound, contains no element of Q or no compound derived from the element. Accordingly, the polymerization method of the present invention has an advantage from a viewpoint of a cost compared to the conventional method wherein polymerization is performed by introducing the three kinds of reactants, i.e., the compound represented by the aforementioned general formula (II), the aforementioned ionic compound and the organoaluminum compound, into a reaction system. In addition, the polymerization method of the present invention involves less numbers of reactants participating in the reaction, and as a result, the reaction can be easily controlled and efficient and inexpensive polymerization can be achieved.

The content of the 1,4-cis-configuration in the microstructure of the polymer obtained by the method of the present invention may generally be 80 mol % or more, preferably 90 mol % or more, more preferably 95 mol % or more, and most preferably 98 mol % or more. As for the molecular weight distribution, Mw/Mn may be 2.00 or less, preferably 1.80 or less, more preferably 1.60 or less, further preferably 1.40 or less, and most preferably 1.30 or less. The polymers obtained by the method of present invention are expected to have superior thermal characteristics (thermal stability and the like) and mechanical properties (tensile modulus, bending modulus and the like), and therefore, they can be utilized for various applications as polymeric materials.

EXAMPLES

The present invention will be explained more specifically with reference to the following examples. However, the scope of the present invention is not limited to these examples. Microstructures of polybutadiene referred to in the examples were calculated from integration ratios of peaks observed by $^1H$ NMR and $^{13}C$ NMR [$^1H$ NMR: δ 4.8–5.0 (=$CH_2$ of 1,2-vinyl unit), 5.2–5.8 (—CH= of 1,4-unit and —CH= of 1,2-vinyl unit), $^{13}C$ NMR: δ 27.4 (1,4-cis unit), 32.7 (1,4-trans unit), 127.7–131.8 (1,4-unit), 113.8–114.8 and 143.3–144.7 (1,2-vinyl unit)]. The weight average molecular weights (Mw), number average molecular weights (Mn) and molecular weight distributions (Mw/Mn) were obtained by gel permeation chromatography using polystyrene as a standard substance.

Example 1

Preparation of [(Cp·X·)$_2$Sm] [B(C$_6$F$_5$)$_4$]

In a glove box under nitrogen atmosphere, 255 mg of dimethylaluminum(μ-dimethyl)bis(pentamethylcyclopentadienyl)samarium [(Cp·X·)$_2$Sm(μ-Me)$_2$AlMe$_2$] (Cp*: pentamethylcyclopentadienyl ligand) was dissolved in 50 ml of toluene. Then, 461 mg of triphenylcarbonium tetrakis(pentafluorophenyl)borate (Ph$_3$CB(C$_6$F$_5$)$_4$) was added and reacted at room temperature for 1 hour. Toluene was evaporated, and the residue was washed with hexane and with cool toluene, and then evaporated to dryness under reduced pressure to obtain 180 mg of red crystals (yield 30%). The resulting complex was subjected to the X-ray structural analysis to find that the complex was a trivalent cation complex represented by the composition: [(Cp*)$_2$Sm] [B(C$_6$F$_5$)$_4$] and formed a dimmer. In addition, no aluminum existed in this complex which was contained in (Cp*)$_2$Sm(μ-Me)$_2$AlMe$_2$ used as a material.

Example 2

In the same manner as in Example 1, orange crystals represented by the composition: [(Cp*)$_2$Ce] [B(C$_6$F$_5$)$_4$], green crystals represented by the composition: [(Cp*)$_2$Pr] [B(C$_6$F$_5$)$_4$], green crystals represented by the composition: [(CP*)$_2$Nd] [B(C$_6$F$_5$)$_4$], and white crystals represented by the composition: [(Cp*)$_2$Gd] [B(C$_6$F$_5$)$_4$] were separately obtained.

Example 3

In a glove box under nitrogen atmosphere, 0.01 mmol of bispentamethylcyclopentadienylsamarium tetrakis(pentafluorophenyl)borate [(CP*)$_2$Sm] [B(C$_6$F$_5$)$_4$] was put into a sufficiently dried 30-ml pressure glass bottle, and dissolved in 6 ml of toluene. Then, 0.05 mmol of triisobutylaluminium was added, and the bottle was sealed with a stopper. The bottle was then taken out from the glove box, and 1.35 g of 1,3-butadiene was put into the bottle, and then polymerization was carried out for 5 minutes at 50° C. After the polymerization, 10 ml of a 10 wt % methanol solution of BHT [2,6-bis(t-butyl)-4-methylphenol] was added to the reaction system to stop the reaction. The polymer was separated by using a larger amount of a mixed solvent of methanol/hydrochloric acid, and dried at 60° C. in vacuo. The yield of the resulting polymer was 80 wt %. The cis-content in the microstructure of the polymer was 95.6 mol %. The number average molecular weight was 126,500 and Mw/Mn was 1.67.

Example 4

The polymerization was carried out in the same manner as in Example 3 except that the polymerization was carried out at −20° C. for 5 hours. The yield of the resulting polymer was 61 wt %. The cis-content in the microstructure of the polymer was 99.5 mol %. The number average molecular weight was 628,100 and Mw/Mn was 1.76.

Example 5

An experiment was carried out in the same manner as in Example 3 except that bispentamethylcyclopentadienylneodymium tetrakis(pentafluorophenyl)borate [(Cp*)$_2$Nd] [B(C$_6$F$_5$)$_4$] was used in place of [(Cp*)$_2$Sm] [B(C$_6$F$_5$)$_4$]. The yield of the resulting polymer was 69 wt %. The cis-content in the microstructure of the polymer was 96.0 mol %. The number average molecular weight was 228,500 and Mw/Mn was 1.66.

The present disclosure relates to subject matter contained in priority Japanese Patent Application No. 2001-053550, filed on Feb. 28, 2001, the contents of which is herein expressly incorporated by reference in its entirety.

What is claimed is:

1. A catalyst in a solid state for polymerization of a conjugated diene or copolymerization of a conjugated diene and an aromatic vinyl compound, comprising a metallocene-cation complex of a rare earth metal compound, said catalyst having formula (I): R$_a$MX$_b$, wherein M represents a rare earth metal; R represents a cyclopentadienyl group, a substituted cyclopentadienyl group, an indenyl group, a substituted indenyl group, a fluorenyl group, or a substituted fluorenyl group; X represents tetra(phenyl)borate, tetrakis(monofluorophenyl)borate, tetrakis(difluorophenyl)borate, tetrakis(trifluorophenyl)borate, tetrakis(trifluorophenyl) borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate or tridecahydride-7,8-dicarbaundecaborate; a represents an integer of 1 or 2; and b represents an integer of 1 or 2.

2. A method for polymerization of a conjugated diene or copolymerization of a conjugated diene and an aromatic vinyl compound, comprising polymerizing said diene or diene and aromatic vinyl compound in the presence of an organoaluminum compound and a metallocene cation complex of formula (I): R$_a$MX$_b$, wherein M represents a rare earth metal; R represents a cyclopentadienyl group, a substituted cyclopentadienyl group, an indenyl group, a substituted indenyl group, a fluorenyl group, or a substituted fluorenyl group; X represents an anion; a represents an integer of 1 or 2; and b represents an integer of 1 or 2.

3. The method according to claim 2, wherein the metallocene cation complex in a solid state is added to the diene or diene and aromatic vinyl compound, or is added as a solution obtained by dissolving solid metallocene cation complex.

4. A catalyst according to claim 1, wherein M is samarium.

5. A catalyst according to claim 1, wherein at least one R is a cyclopentadienyl group substituted by methyl, ethyl, n-propyl, isopropyl, n-butyl, isobutyl, sec-butyl, tert-butyl, hexyl, phenyl, benzyl, a vinyl group or by trimethylsilyl.

6. A catalyst according to claim 1, wherein R is bound to X by a bridging group.

7. A catalyst according to claim 6, wherein the bridging group is dimethylsilyl, dimethylmethylene, methylphenylmethylene, diphenylmethylene or an ethylene group.

8. A catalyst according to claim 1, wherein two R groups are bound to each other by a bridging group.

9. A catalyst according to claim 8, wherein the bridging group is dimethylsilyl, dimethylmethylene, methylphenylmethylene, diphenylmethylene or an ethylene group.

10. A catalyst according to claim 1, wherein R is methylcyclopentadienyl, benzylcyclopentadienyl, vinylcyclopentadienyl, 2-methoxyethylcyclopentadienyl, trimethylsilylcyclopentadienyl, tert-butylcyclopentadienyl, ethylcyclopentadienyl, phenylcyclopentadienyl, 1,2-dimethylcyclopentadienyl, 1,3-dimethylcyclopentadienyl, 1,3-di(tert-butyl)cyclopentadienyl, 1,2,3-trimethylcyclopentadienyl, 1,2,3,4-tetramethylcyclopentadienyl, pentamethylcyclopentadienyl, 1-ethyl-2,3,4,5-tetramethylcyclopentadienyl, 1-benzyl-2,3,4,5-tetramethylcyclopentadienyl, 1-phenyl-2,3,4,5-tetramethylcyclopentadienyl, 1-trimethylsilyl-2,3,4,5-tetramethylcyclopentadienyl, 1-trifluoromethyl-2,3,4,5-tetramethylcyclopentadienyl, 1,2,3-trimethylindenyl, heptamethylindenyl, or 1,2,4,5,6,7-hexamethylindenyl.

11. A catalyst according to claim 1, wherein R is pentamethylcyclopentadienyl.

12. A catalyst, which is bispentamethylcyclopentadienylsamarium tetrakis(pentafluorophenyl)borate, bispentamethylcyclopentadienylcerium tetrakis(pentafluorophenyl)borate, bispentamethylcyclopentadienylpraseodymium tetrakis(pentafluorophenyl)borate, bispentamethylcyclopentadienylneodymium tetrakis(pentafluorophenyl)borate, or bispentamethylcyclopentadienylgadolinium tetrakis(pentafluorophenyl)borate.

13. A catalyst in a solid state for polymerization of a conjugated diene or copolymerization of a conjugated diene and an aromatic vinyl compound, comprising a metallocene-cation complex of a rare earth metal compound, said catalyst having formula (I): R$_a$MX$_b$, wherein M represents a rare earth metal; R represents a cyclopentadienyl group, a substituted cyclopentadienyl group, an indenyl group, a substituted indenyl group, a fluorenyl group, or a substituted fluorenyl group; X represents an anion bound to R by a bridging group, a represents an integer of 1 or 2; and b represents an integer of 1 or 2.

14. A catalyst according to claim 13, wherein the bridging group is dimethylsilyl, dimethylmethylene, methylphenylmethylene, diphenylmethylene or an ethylene group.

* * * * *